(12) United States Patent
Motokawa et al.

(10) Patent No.: US 8,090,295 B2
(45) Date of Patent: Jan. 3, 2012

(54) CONDUCTIVE RUBBER MEMBER

(75) Inventors: Shinji Motokawa, Shinagawa-ku (JP);
Naoki Hirakawa, Shinagawa-ku (JP)

(73) Assignee: Synztec Co., Ltd., Tokyo (JP)

( * ) Notice: Subject to any disclaimer, the term of this patent is extended or adjusted under 35 U.S.C. 154(b) by 0 days.

(21) Appl. No.: 12/062,220

(22) Filed: Apr. 3, 2008

(65) Prior Publication Data
US 2008/0247778 A1 Oct. 9, 2008

(30) Foreign Application Priority Data

Apr. 4, 2007 (JP) ................................ 2007-098797
Apr. 2, 2008 (JP) ................................ 2008-095724

(51) Int. Cl.
*G03G 15/02* (2006.01)
*C08G 18/62* (2006.01)
*B32B 25/14* (2006.01)

(52) U.S. Cl. .................... 399/156; 399/176; 428/423.3; 428/423.9

(58) Field of Classification Search .................. 399/176, 399/159; 428/423.1, 423.3, 423.9, 492
See application file for complete search history.

(56) References Cited

U.S. PATENT DOCUMENTS

| | | | |
|---|---|---|---|
| 3,936,170 A | 2/1976 | Shibano et al. | |
| 4,807,341 A | 2/1989 | Nielsen et al. | |
| 4,887,340 A | 12/1989 | Kato et al. | |
| 5,102,741 A | 4/1992 | Miyabayashi | |
| 5,471,285 A | 11/1995 | Nagase et al. | |
| 5,659,854 A | 8/1997 | Masuda et al. | |
| 5,733,235 A | 3/1998 | Waku et al. | |
| 6,032,943 A | 3/2000 | Yabushita et al. | |
| 6,400,919 B1 | 6/2002 | Inoue et al. | |
| 6,534,180 B2 * | 3/2003 | Hoshi | 428/413 |
| 6,558,781 B1 | 5/2003 | Fuei et al. | |
| 6,660,399 B1 | 12/2003 | Kitano et al. | |
| 7,638,196 B2 * | 12/2009 | Hirakawa et al. | 428/413 |
| 2001/0055687 A1 | 12/2001 | Hoshi | |
| 2007/0104906 A1 * | 5/2007 | Hirakawa et al. | 428/36.8 |
| 2007/0110936 A1 * | 5/2007 | Hirakawa et al. | 428/36.8 |
| 2007/0149377 A1 * | 6/2007 | Motokawa et al. | 492/28 |

FOREIGN PATENT DOCUMENTS

| | | |
|---|---|---|
| JP | 4-214579 | 8/1992 |
| JP | 05-158341 A | 6/1993 |
| JP | 5-281831 | 10/1993 |
| JP | 6-175470 | 6/1994 |
| JP | 3444391 B2 | 2/1998 |
| JP | 2002-40760 | 2/2002 |
| JP | 2004-191659 A | 7/2004 |
| JP | 2004-191686 A | 7/2004 |
| JP | 2005-283913 A | 10/2005 |
| JP | 2007-31703 | 2/2007 |

OTHER PUBLICATIONS

USPTO Non-Final Office Action dated Apr. 22, 2010 for co-pending U.S. Appl. No. 11/644,906.

\* cited by examiner

*Primary Examiner* — Thao T. Tran
(74) *Attorney, Agent, or Firm* — Sughrue Mion, PLLC

(57) ABSTRACT

An object of the present invention is to provide a conductive rubber member which exhibits small environmental dependency and stable electrical resistance. The conductive rubber member is formed of a conductive elastic layer which has been imparted with conductivity by means of a conductivity-imparting agent. The conductive elastic layer has, at a surface portion thereof, a surface-treated layer which has been formed through impregnating the surface with a surface-treatment liquid containing an isocyanate component and an ion-conducting polymer.

4 Claims, 2 Drawing Sheets

CONDUCTIVE RUBBER MEMBER

The entire disclosure of Japanese Patent Applications Nos. 2007-98797 filed on Apr. 4, 2007 and 2008-95724 filed on Apr. 2, 2008 is expressly incorporated by reference herein.

BACKGROUND OF THE INVENTION

1. Field of the Invention

The present invention relates to a conductive rubber member suitable for use in an image-forming apparatus such as an electrophotographic copying machine or printer or a toner-jet copying machine or printer, and more particularly to a conductive rubber member suitable for a conductive roller, blade, belt, etc.

2. Background Art

Conductive rollers employed in an image-forming apparatus such as an electrophotographic copying machine or printer are required to have satisfactory conductivity and not stain a member such as a photoreceptor. Therefore, conventionally, such rollers have been made of polyurethane or silicone rubber Japanese Patent Application Laid-Open (kokai) Nos. 6-175470 (Claims, etc.), 5-281831 (Claims, etc.), 4-214579 (Claim 2, [0022], etc.), 2002-040760 (Claims, etc.), among other documents, disclose improved conductive rollers in which a coating layer or a surface-treated layer is provided on the surface of an elastic layer, or a coating tube is fitted to conductive rollers.

The present applicant previously developed a charge-imparting member which can be produced at low cost and which maintains excellent performance for a long period of time, and filed an application (see Japanese Patent Application Laid-Open (kokai) No. 2002-040760 (Claims, etc.)). The disclosed charge-imparting member has an elastic layer formed of an epichlorohydrin-based rubber material, and a surface-treated layer which has been formed through treating the surface of the elastic layer with a surface-treatment liquid containing a conductivity-imparting agent, at least one species selected from an acrylic fluoropolymer and an acrylic silicone polymer, and an isocyanate component.

The conductive roller disclosed in Japanese Patent Application Laid-Open (kokai) No. 2002-040760 is produced by use of a surface-treatment liquid containing a conductivity-imparting agent such as carbon black. Although the roller is imparted with conductivity, electrical resistance of the roller tends to vary in accordance with the dispersion state of carbon black, which is problematic.

When a conducting agent other than carbon black is used, properties of the roller are largely affected by environmental factors, failing to attain consistent image formation, which is also problematic.

The present applicant also developed a conductive rubber member and disclosed such a member in Japanese Patent Application Laid-Open (kokai) No. 2007-31703 (see Claims, etc.). The disclosed conductive rubber member has a surface-treated layer which has been produced through impregnating the surface portion of the rubber member with a surface-treatment liquid containing an ion-conductivity-imparting agent and a thermosetting compound dissolved in a solvent, followed by thermosetting. The conductive rubber member is less affected by environmental factors and exhibits stable electrical resistance. However, when used under severe working conditions, the rubber member tends to exhibit large variation in electrical resistance.

SUMMARY OF THE INVENTION

In view of the foregoing, an object of the present invention is to provide a conductive rubber member which is less affected by environmental factors and exhibits stable electrical resistance.

Accordingly, in a first mode of the present invention for attaining the above object, there is provided a conductive rubber member formed of a conductive elastic layer which has been imparted with conductivity by means of a conductivity-imparting agent, wherein the conductive elastic layer has, at a surface portion thereof, a surface-treated layer which has been formed through impregnating the surface portion with a surface-treatment liquid containing an isocyanate component and an ion-conducting polymer.

A second mode of the present invention is drawn to a specific embodiment of the conductive rubber member according to the first mode, wherein the surface-treatment liquid contains an organic solvent, and the isocyanate component and the ion-conducting polymer are dissolved in the organic solvent.

A third mode of the present invention is drawn to a specific embodiment of the conductive rubber member according to the first or second mode, wherein the ion-conducting polymer is at least one of the polymer selected from the group consisting of acrylonitrile-butadiene rubber, epichlorohydrin rubber, and a polymer containing alkylene oxide.

A fourth mode of the present invention is drawn to a specific embodiment of the conductive rubber member according to any of the first to third modes, wherein the surface-treatment liquid contains carbon black.

A fifth mode of the present invention is drawn to a specific embodiment of the conductive rubber member according to any of the first to fourth modes, wherein the conductive elastic layer is formed of a rubber material containing epichlorohydrin rubber.

A sixth mode of the present invention is drawn to a specific embodiment of the conductive rubber member according to any of the first to fifth modes, wherein the conductive rubber member is in the form of roller, blade, or belt.

According to the present invention, a conductive rubber member is produced by use of a surface-treatment liquid containing an isocyanate component and an ion-conducting polymer. Therefore, the produced conductive rubber member is less affected by environmental factors and exhibits stable electrical resistance.

BRIEF DESCRIPTION OF THE DRAWINGS

Various other objects, features, and many of the attendant advantages of the present invention will be readily appreciated as the same becomes better understood with reference to the following detailed description of the preferred embodiments when considered in connection with the accompanying drawings in which.

DETAILED DESCRIPTION OF PREFERRED EMBODIMENTS

The present invention will next be described in detail, taking a conductive roller as one embodiment of the conductive rubber member of the present invention.

Figure 1A:
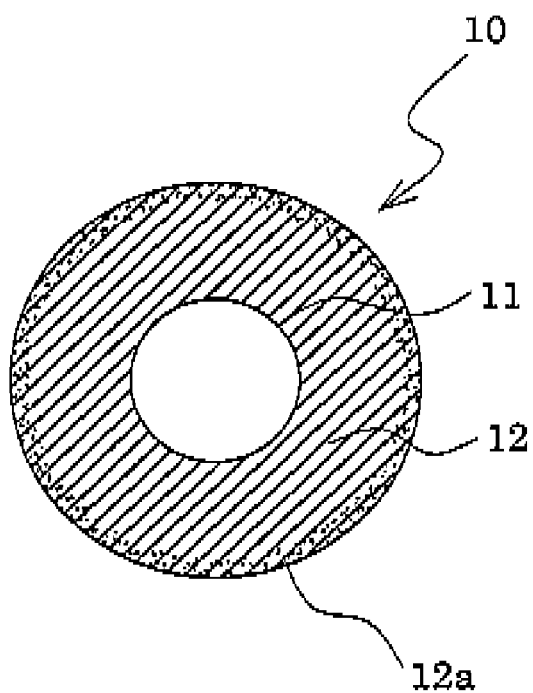
FIGS. 1A and 1B are cross-sections of a conductive roller employing a conductive rubber member falling within the scope of the present invention.
Figure 1B:
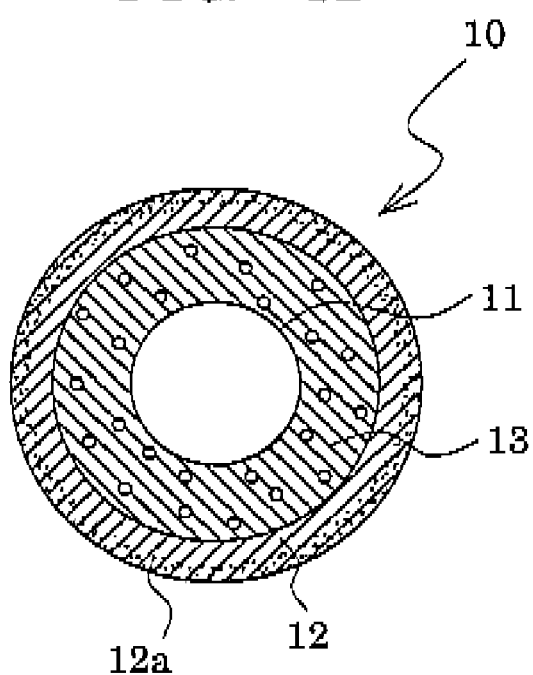

FIGS. 1A and 1B are cross-sections of a conductive roller employing a conductive rubber member falling within the scope of the present invention.

In FIG. 1A, a conductive roller 10 has a metal shaft 11 and a conductive elastic layer 12 provided thereon. The surface portion of the conductive elastic layer 12 is formed of a surface-treated layer 12a. The surface-treated layer 12a is formed through impregnating the surface portion of the conductive elastic layer 12 with a surface-treatment liquid, followed by hardening. Thus, the surface-treated layer 12a is incorporated into the conductive elastic layer 12.

In FIG. 1B, a conductive roller 10 may have an optional layer 13 between the metal shaft 11 and the conductive elastic layer 12. The layer 13 provided between the conductive elastic layer 12 and the metal shaft 11 may be a foamed or non-foamed layer, or may be a single layer or of a multilayer structure having two or more layers, so long as the uppermost layer is a conductive elastic layer satisfying the requirements described hereinbelow.

Needless to say, the conductive elastic layer 12 may be solid (non-foamed) or sponge-form (foamed). Furthermore, the surface portion of the elastic layer 12 may or may not be polished.

No particular limitation is imposed on the rubber material employed in the conductive elastic layer 12 of the conductive roller 10 of the present embodiment. Examples of the rubber material include epichlorohydrin rubber, polyurethane, acrylonitrile-butadiene rubber (NBR), chloroprene rubber (CR), styrene rubber (SBR), acrylic rubber (ACM), ethylene-propylene rubber (EPDM), and silicone rubber (Q). Of these, epichlorohydrin rubber is preferably employed, since epichlorohydrin rubber can impart conductivity to the elastic layer.

Examples of the epichlorohydrin rubber include epichlorohydrin homopolymer, epichlorohydrin-ethylene oxide copolymer, epichlorohydrin-allyl glycidyl ether copolymer, epichlorohydrin-ethylene oxide-allyl glycidyl ether terpolymer, epichlorohydrin-ethylene oxide-propylene oxide-allyl glycidyl ether 4-component copolymer, and derivatives thereof. These polymers may be used singly or in combination of two or more species. The epichlorohydrin rubber may be appropriately blended with other rubber materials. Examples of the rubber material to be blended include acrylonitrile-butadiene rubber (NBR), polyurethane, chloroprene rubber (CR), and styrene rubber (SBR).

Examples of preferred polyurethanes include polyether-polyurethane, polyester-polyurethane, and polycarbonate-polyurethane. These polyurethanes may be a castable polyurethane or a millable polyurethane. Of these, a castable polyurethane produced through reaction between urethane polyol and polyisocyanate is preferred. Examples of the isocyanate to be reacted with polyol include 3-functional isocyanate monomers such as triphenylmethane triisocyanate, tris (isocyanatophenyl) thiophosphate, and bicycloheptane triisocyanate; and mixtures such as cyanurate-modified polyisocyanates of hexamethylene diisocyanate (trimer: 3-functional, and pentamer; 4-functional) and polymeric MDI. A mixture of such a polyisocyanate of $\geq 3$ functions and a general bifunctional isocyanate compound may also be employed. Examples of the bifunctional isocyanate compound include 2,4-toluene diisocyanate (TDI), 4,4'-diphenylmethane diisocyanate (MDI), p-phenylene diisocyanate (PPDI), 1,5-naphthalene diisocyanate (NDI), 3,3-dimethyl-diphenyl-4,4'-diisocyanate (TODI), and modified products and oligomers such as prepolymers having such an isocyanate at both chain terminals.

The conductive elastic layer 12 must contain a conductivity-imparting agent. That is, the conductive elastic layer 12 is a vulcanized product of a rubber composition containing a rubber material and a conductivity-imparting agent. The conductivity-imparting agent may use an electron-conductivity-imparting agent such as metallic powder or carbon black, an ion-conductivity-imparting agent, or in combination of these. The conductivity-imparting agent is preferably carbon black. Examples of the ion-conductivity-imparting agent include an organic salt, an inorganic salt, a metal complex, and an ionic liquid. Examples of the organic salt and inorganic salt include lithium perchlorate, a quaternary ammonium salt, and sodium trifluoroacetate. Examples of the metal complex include ferric halide-ethylene glycol. A more specific example is a diethylene glycol-ferric chloride complex disclosed in Japanese Patent No. 3655364. Meanwhile, ionic liquid, which is also called ambient temperature molten salt, is a molten salt which is in the liquid form at room temperature, having a melting point of 70° C. or lower, preferably 30° C. or lower. Specific examples of ionic liquid include 1-ethyl-3-methylimidazolium bis(trifluoromethylsulfonyl)imide and 1-butyl-3-ethylimidazolium (trifluoromethylsulfonyl)imide, which are disclosed in Japanese Patent Application Laid-Open (kokai) No. 2003-202722.

Notably, addition of the conductivity-imparting agent in an amount greater than the minimum required amount is not required, and an amount around the minimum amount required for attaining a target electrical resistance is preferred. As mentioned hereinbelow, when the amount is in excess of the required amount, a target electrical resistance, for example, a middle level resistance of about $10^4$ to about $10^7 \Omega$, is difficult to attain after formation of a surface-treated layer. When carbon black is employed, the amount of conductivity-imparting agent is about 10 wt. % or less, preferably about 7 wt. % or less.

The surface-treated layer 12a is formed through impregnation of a surface portion of the conductive elastic layer 12 with a surface-treatment liquid, followed by hardening, so that the surface portion of the conductive elastic layer 12 serves as the surface-treated layer. More specifically, the surface-treated layer 12a is formed through impregnation of a surface portion of the conductive elastic layer with a surface-treatment liquid containing at least an isocyanate component and an ion-conducting polymer. In the surface-treated layer, which is integrated with the conductive elastic layer 12, the density of the isocyanate component and that of the ion-conducting polymer gradually decrease from the top of the surface to the inside. Impregnation of the surface portion of the conductive elastic layer 12 with a surface-treatment liquid may be performed through immersing the conductive elastic layer 12 in a surface-treatment liquid for a predetermined period of time, or applying (coating or spraying) a surface-treatment liquid onto the conductive elastic layer 12, whereby the surface-treatment liquid is caused to permeate the surface portion of the conductive elastic layer 12.

Preferably, the surface-treatment liquid contains an organic solvent, and the isocyanate component and the ion-conducting polymer are essentially dissolved in the solvent.

The term "ion-conducting polymer" refers to a polymer having a polar group and a middle level electrical resistance of $1.0 \times 10^4$ to $1.0 \times 10^9 \Omega$, preferably $1.0 \times 10^7$ to $1.0 \times 10^9 \Omega$.

The ion-conducting polymer is preferably dissolved in the aforementioned organic solvent. The ion-conducting polymer more preferably can impart elasticity to the surface-treated layer, because the softness and strength of the surface-treated layer are enhanced, and wearing of the surface of a roller and damaging to the surface of a photoreceptor which the roller contacted are prevented. Examples of the ion-conducting polymer include acrylonitrile-butadiene rubber (NBR), epichlorohydrin rubber, and a polymer containing alkylene oxide. Examples of the epichlorohydrin rubber include epichlorohydrin homopolymer, epichlorohydrin-ethylene oxide copolymer, epichlorohydrin-allyl glycidyl ether copolymer, epichlorohydrin-ethylene oxide-allyl glycidyl ether terpolymer, epichlorohydrin-ethylene oxide-propylene oxide-allyl glycidyl ether 4-component copolymer, and derivatives thereof. Examples of the alkylene oxide-containing polymer include ethylene oxide homopolymer, ethylene oxide-propylene oxide copolymer, ethylene oxide-allyl glycidyl ether copolymer, ethylene oxide-propylene oxide-allyl glycidyl ether terpolymer, and derivatives thereof. These ion-conducting polymers may be used singly or in combination of two or more species.

When the organic solvent contained in the surface-treatment liquid permeates the conductive elastic layer 12, the conductive elastic layer 12 swells slightly, and minute cracks are generated. In the case where the conductivity-imparting agent is an electron-conductivity-imparting agent, a conduction network structure (conduction paths) is broken. However, minute cracks are filled with at least an isocyanate component and an ion-conducting polymer contained in surface-treatment liquid. After removal of the organic solvent, the isocyanate component inhibits restoration of the broken network structure of the conductivity-imparting agent in the conductive elastic layer 12 to the state before swelling, whereas the ion-conducting polymer links the broken portions of the conductivity-imparting agent network structure. Through the process, the isocyanate component and the ion-conducting polymer are present in the broken conductivity-imparting agent network structure. Thus, into the conduction path in the surface portion of the conductive roller 10, a middle level resistance portion containing the isocyanate component and the ion-conducting polymer is incorporated. The state differs from that before the surface treatment. That is, electrical resistance increases slightly.

In contrast, when the conductivity-imparting agent is an ion-conductivity-imparting agent, low electrical resistance can be maintained. Specifically, when the organic solvent contained in the surface-treatment liquid permeates the conductive elastic layer 12, the conductive elastic layer 12 swells slightly, and minute cracks are generated. The minute cracks are filled with at least an isocyanate component and an ion-conducting polymer contained in surface-treatment liquid. In this case, although the conductive elastic layer 12 has no conduction network structure (conduction path) of an electron-conductivity-imparting agent, the ion-conducting polymer is incorporated in the isocyanate component having high resistance. Therefore, electrical resistance can be maintained at a low level.

The isocyanate component has a function of increasing the hardness of the surface portion (surface-treated layer 12a) of the conductive elastic layer 12. However, when an ion-conducting polymer is used in combination, elasticity (softness) of the surface-treated layer 12a can be maintained.

The conductive elastic layer is impregnated with the isocyanate component and the ion-conducting polymer such that the isocyanate component concentration and the ion-conducting polymer concentration gradually decrease from the top of the surface to the inside. Thus, the electrical resistance of the layer increases toward the top surface. That is, the surface-treated layer 12a is provided as a resistance-gradient layer.

According to the present invention, the surface-treated layer 12a is formed through impregnating the surface portion of the conductive elastic layer 12 with a surface-treatment liquid containing an ion-conducting polymer, whereby the conductive roller 10 can have electrical properties of interest in a simple manner. As mentioned above, the ion-conducting polymer per se is a substance having a middle-level resistance, and the mechanism of attaining a middle-level resistance of the surface treated layer is different from that of carbon black; i.e., formation of a middle-level-resistance surface-treated layer 12a through dispersion thereof to lower the electrical resistance of a substrate (the conductive elastic layer 12). In other words, the ion-conducting polymer does not modulate the electrical resistance through dispersion, whereas carbon black does. In addition, staining of the roller surface and the surface of a photoreceptor which the roller contacts is prevented, whereas an ion-conducting agent stains such surfaces. As compared with an ion-conducting agent, the ion-conducting polymer is stable against water. Thus, the conductive roller 10 produced by use of a surface-treatment liquid containing an ion-conducting polymer is less affected by environmental factors.

Examples of the isocyanate component contained in the surface-treatment liquid include 2,6-tolylene diisocyanate (TDI), 4,4'-diphenylmethane diisocyanate (MDI), p-phenylene diisocyanate (PPDI), 1,5-naphthalene diisocyanate (NDI), 3,3-dimethyldiphenyl-4,4-diisocyanate (TODI), and the aforementioned modified products and oligomers. A prepolymer formed from a polyol and an isocyanate may also be employed.

The surface-treatment liquid contains the aforementioned components, but may further contain carbon black (e.g., Acetylene Black, Ketjen Black, or Toka Black) or an ion-conducting agent, in order to further lower electrical resistance. The surface-treatment liquid, which contains an ion-conducting polymer, can impart conductivity to the surface-treated layer 12a. Therefore, when carbon black or an ion-conducting agent is added, a satisfactory effect can be realized through addition thereof in a small amount.

The amount of carbon black incorporated in the surface-treatment liquid is preferably 0 to 40 wt. % with respect to the isocyanate component. An excessive amount is not preferred, since problems such as removal of added carbon black and variation in electrical resistance occur.

So long as the performance of the surface-treatment liquid is not impaired, the surface-treatment liquid may further contain a polymer selected from an acrylic fluoropolymer and an acrylic silicone polymer.

The acrylic fluoropolymer and the acrylic silicone polymer can be solved in a specific organic solvent and reacts with an isocyanate compound to form a chemical bond. The acrylic fluoropolymer is a fluorine-containing polymer which is soluble in a solvent and which has a functional group such as a hydroxyl group, an alkyl group, or a carboxyl group. Examples of the acrylic fluoropolymer include an acrylate ester-fluoroalkyl acrylate block copolymer and derivatives thereof. The acrylic silicone polymer is a silicone-based polymer which is soluble in a solvent, and examples thereof include an acrylate ester-siloxane acrylate block copolymer and derivatives thereof.

No particular limitation is imposed on the organic solvent employed in the surface-treatment liquid, so long as the solvent can dissolve the isocyanate component, the ion-conducting polymer, and optional additives of carbon black, the acrylic fluoropolymer, and the acrylic silicone polymer. Examples of the organic solvent include ethyl acetate, methyl ethyl ketone (MEK), and toluene.

The conductive rubber member according to the present invention is suitably used as a conductive roller, a blade, a belt, etc.

EXAMPLES

The present invention will next be described in detail by way of examples, which should not be construed as limiting the invention thereto. Unless otherwise specified, the unit "part(s)" represents "part(s) by weight."

Example 1

Production of a Roller

Epichlorohydrin rubber (Epichlomer CG-102, product of Daiso Co., Ltd.) (100 parts), sodium trifluoroacetate (0.5 parts) serving as a conducting agent, zinc flower (3 parts), stearic acid (2 parts), and a vulcanizer (1.5 parts) were kneaded by means of a roll mixer, and the kneaded product was press-formed on the surface of a metallic shaft under predetermined vulcanization conditions (160° C.×30 min). The outer surface of the thus-coated shaft was polished, to thereby adjust the outer diameter to a predetermined value, producing a roller member having an elastic layer on the surface of the shaft.

Preparation of Surface-Treatment Liquid

An isocyanate compound (MDI) (15 parts) and epichlorohydrin rubber (Epichlomer C, product of Daiso Co., Ltd.) (3 parts) were added to and dissolved in ethyl acetate (100 parts), to thereby prepare a surface-treatment liquid.

Surface-Treatment of a Roller

The above-produced roller member was immersed for 60 seconds in the thus-prepared surface-treatment liquid maintained at 23° C., and subsequently heated for one hour in an oven maintained at 120° C., to thereby form a surface-treated layer. The thus-treated roller member was employed as an Example 1 conductive roller.

Example 2

Ethyl acetate (100 parts), Acetylene Black (product of Denki Kagaku Kogyo K.K.) (2 parts), and epichlorohydrin rubber (Epichlomer C, product of Daiso Co., Ltd.) (3 parts) were mixed, so as to disperse the components, for three hours by means of a ball mill. An isocyanate compound (MDI) (15 parts) was added to and dissolved in the mixture, to thereby prepare a surface-treatment liquid. The Example 1 roller member was treated with the surface-treatment liquid, to thereby form a surface-treated layer. The thus-treated roller member was employed as an Example 2 conductive roller.

Example 3

Toluene (100 parts), Acetylene Black (product of Denki Kagaku Kogyo K.K.) (2 parts), a polyethylene oxide-polypropylene oxide-allyl glycidyl ether terpolymer (Zeospan 8030, product of Nippon Zeon Co., Ltd.) (8 parts), an acrylic silicone polymer (Modiper FS700, product of Nippon Oil & Fats Co., Ltd.) (1 part), and an acrylic fluoropolymer (Novafusso, product of Dai Nippon Shikizai Kogyo Co., Ltd.) (1 part) were mixed, so as to disperse the components, for three hours by means of a ball mill. An isocyanate compound (MDT) (10 parts) was added to and dissolved in the mixture, to thereby prepare a surface-treatment liquid. In a manner similar to that of Example 1, the Example 1 roller member was treated with the surface-treatment liquid, to thereby form a surface-treated layer. The thus-treated roller member was employed as an Example 3 conductive roller.

Example 4

Production of a Roller

Acrylonitrile-butadiene rubber (middle to high nitrile content) (100 parts), Toka Black #5500 (product of Tokai Carbon Co., Ltd.) (10 parts), Asahi Thermal (25 parts), Sanceler TET (product of Sanshin Chemical Ind. Co., Ltd.) (1.5 parts), Sanceler CZ (product of Sanshin Chemical Ind. Co., Ltd.) (1.5 parts), and sulfur (1.0 part) were kneaded by means of a roll mixer, and the kneaded product was extruded onto the surface of a metallic shaft under predetermined vulcanization conditions (160° C.×30 min). The outer surface of the thus-coated shaft was polished, to thereby adjust the outer diameter to a predetermined value, producing a roller member having an elastic layer on the surface of the shaft.

Preparation of Surface-Treatment Liquid

Toluene (100 parts), epichlorohydrin rubber (Epichlomer C, product of Daiso Co., Ltd.) (2 parts), an acrylonitrile-butadiene rubber (middle to high nitrile content) (1 part), an acrylic fluoropolymer (Novafusso, product of Dai Nippon Shikizai Kogyo Co., Ltd.) (1 part) were mixed, so as to disperse the components, for three hours by means of a hall mill. An isocyanate prepolymer (Adiprene L100, product of Uniroyal) (10 part) was added to and dissolved in the mixture, to thereby prepare a surface-treatment liquid.

In a manner similar to that of Example 1, a surface-treated layer was formed by use of the aforementioned surface-treatment liquid, to thereby produce an Example 4 conductive roller.

Example 5

VALCAN XC (product of Cabot) (7 parts) was added to a tri-functional polyether-polyol MN-3050 (product of Mitsui Takeda Chemical) (100 parts) and dispersed in the polyol so that the particle size of carbon black is about 20 µm or less. After controlling the temperature of the dispersion to 80° C., the dispersion was defoamed and dehydrated under reduced pressure, to thereby produce liquid A. Separately, Coronate C-HX (product of Nippon Polyurethane Industry Co., Ltd.) (11 parts) was added to a prepolymer (Adiprene L100, product of Uniroyal) (25 parts) with mixing, and the temperature of the mixture was adjusted to 80° C., to thereby prepare liquid B. Liquids A and B were mixed together, and the liquid mixture was cast-molded onto the surface of a metallic shaft under predetermined vulcanization conditions (120° C.×120 min). The outer surface of the thus-coated shaft was polished, to thereby adjust the outer diameter to a predetermined value, producing a roller member having an elastic layer on the surface of the shaft.

The procedure of Example 3 was repeated, except that lithium perchlorate (0.5 parts) was added instead of Acetylene Black, to thereby prepare a surface-treatment liquid. The aforementioned roller member was treated with the surface-treatment liquid, to thereby form a surface-treated layer. The thus-coated roller was employed as an Example 5 conductive roller.

Comparative Example 1

The procedure of Example 2 was repeated, except that epichlorohydrin rubber (Epichlomer C, product of Daiso Co., Ltd.) was not added, to thereby prepare a surface-treatment liquid. A Comparative Example 1 conductive roller was produced through surface treatment by use of the surface-treatment liquid.

Comparative Example 2

The procedure of Example 1 was repeated, except that ammonium perchlorate (1.0 part) was added instead of epichlorohydrin rubber (Epichlomer C, product of Daiso Co., Ltd.), to thereby prepare a surface-treatment liquid. A Comparative Example 2 conductive roller was produced through surface treatment by use of the surface-treatment liquid.

Comparative Example 3

The procedure of Example 1 was repeated, except that a urethane coating (NeoRez R-940, product of Kusumoto Chemicals, Ltd.) was added instead of the isocyanate compound (MDI), to thereby prepare a surface-treatment liquid and form a 30-μm coating layer. The thus-produced conductive roller was employed as a Comparative Example 3.

Comparative Example 4

The procedure of Example 4 was repeated, except that epichlorohydrin rubber (Epichlomer C, product of Daiso Co., Ltd.) or Acrylonitrile-butadiene rubber (middle to high nitrile content) were not added, to thereby prepare a surface-treatment liquid. A Comparative Example 4 conductive roller was produced through surface treatment by use of the surface-treatment liquid.

Comparative Example 5

The procedure of Example 5 was repeated, except that polyethylene oxide-polypropylene oxide-allyl glycidyl ether terpolymer (Zeospan 8030, product of Nippon Zeon Co., Ltd.) was not added, to thereby prepare a surface-treatment liquid. A Comparative Example 5 conductive roller was produced through surface treatment by use of the surface-treatment liquid.

Test Example 1

Electrical Resistance

Figure 2:
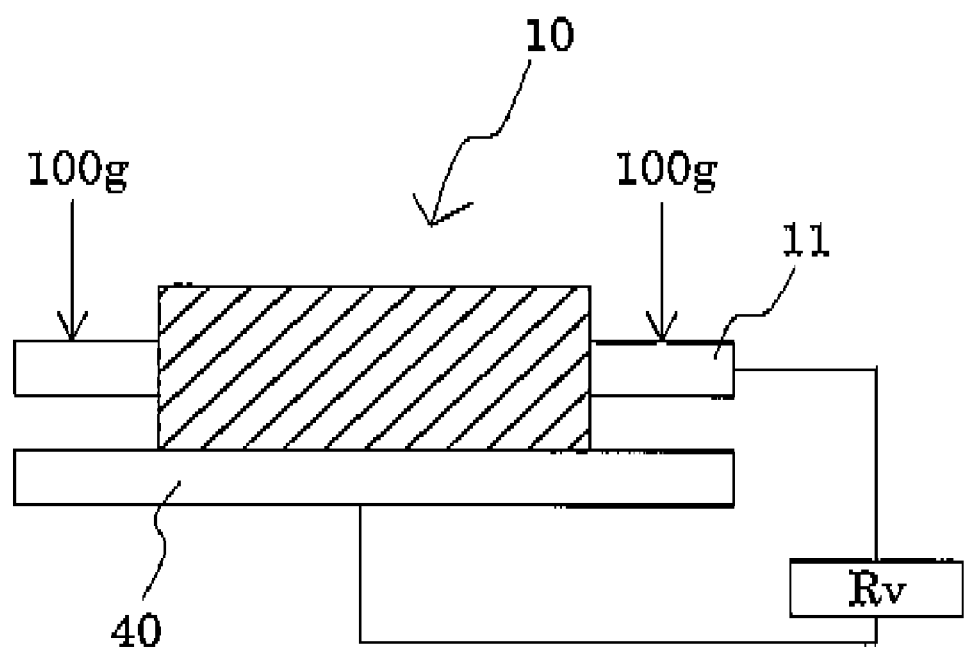
FIG. 2 is a sketch for describing the test procedure of Test Example 1.

The electrical resistance of each of the conductive rollers produced in the Examples and Comparative Examples was measured. As shown in FIG. 2, electrical resistance was measured in the following manner. Specifically, a conductive roller 10 was placed on an electrode member 40 formed of a SUS 304 plate, and a load of 100 g was applied to each end of a metal shaft 11. In this state, electrical resistance between the metal shaft 11 and the electrode member 40 was measured by means of ULTRA HIGH RESISTANCE METER R8340A (product of Advan Test) under normal temperature-normal humidity conditions (N/N: 20° C., 50% RH). The voltage applied during measurement was DC-100 V. The results are shown in Tables 1 and 2.

Test Example 2

Image Evaluation

Each of the conductive rollers produced in Examples 1 to 4 and Comparative Examples 1 to 4 and serving as charge-imparting rollers, and each of the conductive rollers produced in Example 5 and Comparative Example 5 and serving as development rollers were installed in a commercial printer (MICROLINE 9600PS, product of Oki Data). An image was output by operating the printer under the conditions of 10° C. and 30% RH (LL); 25° C. and 50% RH (NN); and 35° C. and 85% RH (HH), and the quality of the output images was evaluated in terms of the following ratings: excellent (O), slightly bad (Δ), and bad (X). The rating "bad" refers to an image in which unevenness in color density, deterioration, etc. were observed. The results are also shown in Tables 1 and 2.

Test Example 3

OPC Staining Test

Each of the conductive rollers produced in Examples 1 to 4 and Comparative Examples 1 to 4 and serving as charge-imparting rollers, and each of the conductive rollers produced in Example 5 and Comparative Example 5 and serving as development rollers were attached to a toner cartridge of a commercial laser-beam printer and caused to contact a photoreceptor under a pressure of 500 gf. The cartridge was allowed to stand for 14 days under the conditions of 50° C. and 90% RH. Thereafter, the cartridge and the conductive roller were installed in the printer, and image output was performed. The quality of the output images was evaluated in terms of the following ratings: excellent (O), slightly bad (Δ), and bad (X). The rating "bad" refers to an image in which unevenness in color density, deterioration, etc. were observed. The surface of the OPC which the roller contacted and that of the conductive roller were observed under a microscope. The results are also shown in Tables 1 and 2.

Test Example 4

Continuous Printing Test

Each of the conductive rollers produced in Examples 1 to 4 and Comparative Examples 1 to 4 and serving as charge-imparting rollers, and each of the conductive rollers produced in Example 5 and Comparative Example 5 and serving as development rollers were installed in a commercial laser printer. After 10,000 continuous printing operations under HH conditions (35° C. and 85% RH) had been completed, a new printing operation was performed under LL conditions, and printed images were evaluated in terms of the following ratings: excellent (O), slightly bad (Δ), and bad (X). The rating "bad" refers to an image in which unevenness in color density, deterioration, etc. were observed. The results are also shown in Tables 1 and 2.

After 10,000 continuous printing operations, electrical resistance was measured in a manner similar to that of Test Example 1. Tables 1 and 2 show the results.

TABLE 1

|  |  | Example 1 | Example 2 | Example 3 | Example 4 | Example 5 |
|---|---|---|---|---|---|---|
| Conductive elastic layer | Rubber material | Epichlorohydrin | Epichlorohydrin | Epichlorohydrin | NBR | Urethane |
|  | Conductivity imparting agent | Ion-conducting agent | Ion-conducting agent | Ion-conducting agent | Carbon black | Carbon black |

TABLE 1-continued

|  |  | Example 1 | Example 2 | Example 3 | Example 4 | Example 5 |
|---|---|---|---|---|---|---|
| Surface-treatment liquid | Isocyanate component | MDI | MDI | MDI | Prepolymer | MDI |
|  | Ion-conducting polymer | Epichlorohydrin | Epichlorohydrin | AO-containing polymer | Epichlorohydrin/ NBR | AO-containing polymer |
|  | Conductivity imparting agent | — | Carbon black | Carbon black | — | Ion-conducting agent |
|  | Others | — | — | Acrylic fluoropolymer Acrylic silicone polymer | Acrylic fluoropolymer | Acrylic fluoropolymer Acrylic silicone polymer |
|  | Organic solvent | Ethyl acetate | Ethyl acetate | Toluene | Toluene | Toluene |
|  | Surface portion | Surface-treated layer | Surface-treated layer | Surface-treated layer | Surface-treated layer | Surface-treated layer |
| Electrical resistance ($\Omega$) (Test Ex. 1) |  | $3.7 \times 10^5$ | $2.3 \times 10^5$ | $6.2 \times 10^5$ | $5.3 \times 10^5$ | $8.1 \times 10^5$ |
| Electrical resistance ($\Omega$) (Test Ex. 4) |  | $1.8 \times 10^6$ | $7.4 \times 10^5$ | $2.4 \times 10^6$ | $1.2 \times 10^6$ | $2.4 \times 10^6$ |
| Image evaluation (Test Ex. 2) | LL conditions | ○ | ○ | ○ | ○ | ○ |
|  | NN conditions | ○ | ○ | ○ | ○ | ○ |
|  | HH conditions | ○ | ○ | ○ | ○ | ○ |
| OPC surface (Test Ex. 3) |  | Good | Good | Good | Good | Good |
| Roller surface (Test Ex. 3) |  | Good | Good | Good | Good | Good |
| Image evaluation (Test Ex. 3) |  | ○ | ○ | ○ | ○ | ○ |
| Image evaluation (Test Ex. 4) |  | ○ | ○ | ○ | ○ | ○ |

TABLE 2

|  |  | Comp. Ex. 1 | Comp. Ex. 2 | Comp. Ex. 3 | Comp. Ex. 4 | Comp. Ex. 5 |
|---|---|---|---|---|---|---|
| Conductive elastic layer | Rubber material | Epichlorohydrin | Epichlorohydrin | Epichlorohydrin | NBR | Urethane |
|  | Conductivity imparting agent | Ion-conducting agent | Ion-conducting agent | Ion-conducting agent | Carbon black | Carbon black |
| Surface-treatment liquid | Isocyanate component | MDI | MDI | — | Prepolymer | MDI |
|  | Ion-conducting polymer | — | — | Epichlorohydrin | — | — |
|  | Other conducting agent | Carbon black | Ion-conducting agent | — | — | Ion-conducting agent |
|  | Others | — | — | Urethane | Acrylic fluoropolymer | Acrylic fluoropolymer Acrylic silicone polymer |
|  | Organic solvent | Ethyl acetate | Ethyl acetate | Toluene | Toluene | Toluene |
|  | Surface portion | Surface-treated layer | Surface-treated layer | Coating layer | Surface-treated layer | Surface-treated layer |
| Electrical resistance ($\Omega$) (Test Ex. 1) |  | $7.1 \times 10^5$ | $4.3 \times 10^4$ | $1.3 \times 10^6$ | $6.0 \times 10^5$ | $5.3 \times 10^6$ |
| Electrical resistance ($\Omega$) (Test Ex. 4) |  | $8.3 \times 10^7$ | $6.7 \times 10^4$ | $3.5 \times 10^8$ | $8.0 \times 10^6$ | $5.1 \times 10^7$ |
| Image evaluation (Test Ex. 2) | LL conditions | X | Δ | ○ | ○ | ○ |
|  | NN conditions | ○ | ○ | ○ | ○ | ○ |
|  | HH conditions | ○ | X | ○ | ○ | ○ |
| OPC surface (Test Ex. 3) |  | Good | Bad | Good | Good | Good |
| Roller surface (Test Ex. 3) |  | Slightly bad | Bad | Slightly bad | Good | Slightly bad |
| Image evaluation (Test Ex. 3) |  | Δ | X | Δ | ○ | Δ |
| Image evaluation (Test Ex. 4) |  | X | X | X | Δ | Δ |

Results

As shown in Table 1, a printer employing, as a charge-imparting roller, the conductive roller of Example 1 (produced by use of a surface-treatment liquid in which epichlorohydrin rubber was dissolved), the conductive roller of Example 2 (produced by use of a similar surface-treatment liquid further containing carbon), or the conductive roller of Example 3 (produced by use of a surface-treatment liquid employing polyethylene oxide-polypropylene oxide-allyl glycidyl ether terpolymer) provided excellent printed images under all conditions (LL, NN, and HH). In the OPC staining test, surface conditions of the OPC and the charge-imparting roller were excellent, and good printed images were obtained.

The printed images after the continuous printing test were also excellent, and no considerable change in electrical resistance was observed before and after the continuous printing test. Therefore, the conductive rollers of Examples 1 to 3 exhibited stable electrical resistance.

In contrast, under LL conditions, a printer employing the conductive roller of Comparative Example 1 as a charge-imparting roller provided bad printed images with uneven color-density dots, presumably attributable to variation in electrical resistance, although excellent printed images were obtained under NN and HH conditions. The considerable variation in electrical resistance, depending on the dispersion state of carbon black, is thought to be caused by elevation in electrical resistance of the charge-imparting roller under LL conditions. In the OPC staining test, a few press marks were observed on the roller surface, and the printed images were evaluated as slightly bad. After the continuous printing test, the electrical resistance significantly increased as compared with the initial value, resulting in impairment of the printed image quality.

A printer employing the conductive roller of Comparative Example 2 as a charge-imparting roller provided slightly bad printed images under LL conditions and bad printed images under HH conditions, although excellent printed images were obtained under NN conditions. The impairment of image quality is thought to be caused by the employment of an ion-conducting agent both in the rubber material and in the surface-treatment liquid, providing a significant effect of water under LL and HH conditions. In the OPC staining test, staining was observed on the OPC surface and the roller surface, presumably caused by the ion-conducting agent, and a few press marks were observed on the roller surface. Thus, the printed images were evaluated as bad. Also in the continuous printing test, printed images were evaluated as bad.

The conductive roller of Comparative Example 3 had a coating layer which had been produced from a mixture of epichlorohydrin rubber and a urethane resin used instead of an isocyanate compound. A printer employing the Comparative Example 3 conductive roller as a charge-imparting roller provided excellent printed images under all test conditions in Test Example 2. However, after the continuous printing test (Test Example 4), bad printed images were obtained. When the surface of the charge-imparting roller was observed after the continuous printing, wrinkles were observed on the roller surface. The wrinkles were thought to be generated by stress concentration at the interface between the rubber layer and the coating layer, exhibiting a different response to displacement. Therefore, provision of a surface-treated layer was considered to be important. Although no stain was observed on the OPC surface in the OPC staining test, a few press marks were observed on the surface of the charge-imparting roller, and the printed images were evaluated as slightly bad.

The conductive roller of Example 4 employed NBR as a rubber material, and was produced by use of a surface-treatment liquid in which epichlorohydrin rubber and NBR had been dissolved. A printer employing the conductive roller Example 4 as a charge-imparting roller provided excellent printed images under all tested conditions in Test Example 2. In the OPC staining test, the OPC surface and the charge-imparting roller surface were in a good state, and excellent printed images were obtained. Excellent printed images were also obtained after the continuous printing test.

The conductive roller of Comparative Example 4 was produced by use of a surface-treatment liquid in which no epichlorohydrin rubber or NBR had been dissolved. The conductive roller of Comparative Example 4 which was used as a charge-imparting roller in a printer exhibited an increased electrical resistance in the continuous printing test, and the printer provided slightly bad printed images, although the printer provided excellent printed images under all tested conditions in Test Example 2. The increase in electrical resistance was thought to be caused by repeated deformation of the roller surface, resulting in breakage of conduction paths formed in the roller surface. In the OPC staining test, the OPC surface and the charge-imparting roller surface were in a good state, and excellent printed images were obtained.

The conductive roller of Example 5 employed urethane rubber as a rubber material, and was produced by use of a surface-treatment liquid in which polyethylene oxide-polypropylene oxide-allyl glycidyl ether terpolymer had been dissolved. A printer employing the conductive roller of Example 5 as a development roller provided excellent printed images under all tested conditions. In the OPC staining test, the OPC surface and the charge-imparting roller surface were in a good state, and excellent printed images were obtained. Excellent printed images were also obtained after continuous printing.

The conductive roller of Comparative Example 5 was produced by use of a surface-treatment liquid in which no polyethylene oxide-polypropylene oxide-allyl glycidyl ether terpolymer had been dissolved. The conductive roller of Comparative Example 5 which was used as a development roller in a printer exhibited an increased electrical resistance in the continuous printing test, and the printer provided slightly bad printed images, although the printer provided excellent printed images under all tested conditions in Test Example 2. Similar to the conductive roller of Comparative Example 4, the increase in electrical resistance was thought to be caused by repeated deformation of the roller surface portion, resulting in breakage of conduction paths formed in the roller surface portion. In the OPC staining test, no staining was observed, but a few press marks were observed on the roller surface, and the printed images were evaluated as slightly bad.

As described hereinabove, the conductive rubber member of the present invention is produced by use of a surface-treatment liquid into which an isocyanate component and an ion-conducting polymer have been incorporated. Therefore, the conductive rubber member is less affected by environmental factors and exhibits stable electrical resistance even after repeated deformation of the roller surface portion.

What is claimed is:

1. A conductive rubber member having a conductive elastic layer made of a rubber material that consists of at least one selected from the group consisting of polyurethane, styrene rubber, acrylic rubber, ethylene-propylene rubber, and silicone rubber and which has been imparted with conductivity by means of a conductivity-imparting agent, wherein the conductive elastic layer has, at a surface portion thereof, a surface-treated layer which has been formed by impregnating the surface with a surface-treatment liquid containing an isocyanate component and at least one of an ion-conducting polymer which is selected from the group consisting of acrylonitrile-butadiene rubber, epichlorohydrin rubber, ethylene oxide homopolymer, ethylene oxide-propylene oxide copolymer, ethylene oxide-allyl glycidyl ether copolymer, and ethylene oxide-propylene oxide-allyl glycidyl ether terpolymer.

2. A conductive rubber member as described in claim 1, wherein the surface-treatment liquid contains an organic solvent, and the isocyanate component and the ion-conducting polymer are dissolved in the organic solvent.

3. A conductive rubber member as described in claim 1, wherein the surface-treatment liquid contains carbon black.

4. A conductive rubber member as described in claim 1, which is in the form of roller, blade, or belt.

* * * * *